(12) United States Patent
Cui

(10) Patent No.: US 12,253,091 B2
(45) Date of Patent: Mar. 18, 2025

(54) HINGE ASSEMBLY, HOUSEHOLD APPLIANCE, ROTARY DEVICE, AND FAN

(71) Applicants: GD MIDEA ENVIRONMENT APPLIANCES MFG CO., LTD., Zhongshan (CN); MIDEA GROUP CO., LTD., Foshan (CN)

(72) Inventor: Shiqiang Cui, Zhongshan (CN)

(73) Assignees: GD MIDEA ENVIRONMENT APPLIANCES MFG CO., LTD., Zhongshan (CN); MIDEA GROUP CO., LTD., Foshan (CN)

( * ) Notice: Subject to any disclaimer, the term of this patent is extended or adjusted under 35 U.S.C. 154(b) by 50 days.

(21) Appl. No.: 17/772,857

(22) PCT Filed: Jul. 27, 2020

(86) PCT No.: PCT/CN2020/104793
§ 371 (c)(1),
(2) Date: Apr. 28, 2022

(87) PCT Pub. No.: WO2021/128832
PCT Pub. Date: Jul. 1, 2021

(65) Prior Publication Data
US 2022/0372985 A1 Nov. 24, 2022

(30) Foreign Application Priority Data

Dec. 25, 2019 (CN) .......................... 201922365175.3
Dec. 25, 2019 (CN) .......................... 201922367642.6

(51) Int. Cl.
*F04D 25/10* (2006.01)
*F04D 29/60* (2006.01)
*F16C 11/10* (2006.01)

(52) U.S. Cl.
CPC ............. *F04D 25/10* (2013.01); *F04D 29/60* (2013.01); *F16C 11/10* (2013.01)

(58) Field of Classification Search
CPC . F04D 5/10; F04D 29/60; F16C 11/10; E05D 11/087
See application file for complete search history.

(56) References Cited

U.S. PATENT DOCUMENTS 4,630,332 A * 12/1986 Bisbing ................. E05D 11/087
16/385
6,106,181 A * 8/2000 Neuhof ................... F16C 11/10
16/382

(Continued)

FOREIGN PATENT DOCUMENTS

CN 203670246 U 6/2014
CN 108343335 A 7/2018

(Continued)

OTHER PUBLICATIONS

Japan Patent Office (JPO) The Office Action For JP Application No. 2022-525325 May 23, 2023 10 Pages (Translation Included).

(Continued)

*Primary Examiner* — Jason W San
*Assistant Examiner* — Matthew J Sullivan
(74) *Attorney, Agent, or Firm* — Anova Law Group, PLLC

(57) ABSTRACT

A hinge assembly includes a rotation shaft, a first connection member provided at the rotation shaft, a second connection member provided at the rotation shaft, located at one side of the first connection member along an axial direction of the rotation shaft, and configured to rotate around the rotation shaft, and an adjustment member connected to the rotation shaft and configured to press the second connection member along the axial direction of the rotation shaft.

20 Claims, 9 Drawing Sheets

(56) References Cited

U.S. PATENT DOCUMENTS

| | | | | |
|---|---|---|---|---|
| 6,581,893 | B1* | 6/2003 | Lu | F16M 11/10 16/337 |
| 6,796,541 | B2* | 9/2004 | Lu | E05D 11/1007 16/342 |
| 7,257,861 | B2* | 8/2007 | Lee | F16M 11/10 16/338 |
| 7,520,480 | B2* | 4/2009 | Lee | F16M 11/10 403/92 |
| 7,530,541 | B2* | 5/2009 | Wang | F16M 11/10 248/921 |
| 7,644,473 | B2* | 1/2010 | Chen | G06F 1/1601 16/340 |
| 7,673,844 | B2* | 3/2010 | Zhang | F16M 11/10 16/337 |
| 7,753,331 | B2* | 7/2010 | Tang | G06F 1/1601 16/342 |
| 8,025,265 | B2* | 9/2011 | Lee | F16M 11/10 248/291.1 |
| 8,251,334 | B2* | 8/2012 | Zhang | F16M 11/10 16/337 |
| 8,967,569 | B2* | 3/2015 | Hsu | F16M 11/10 248/920 |
| 9,371,962 | B2 | 6/2016 | Korcz et al. | |
| 10,267,075 | B2* | 4/2019 | Kenyon | E05D 3/02 |
| 10,294,984 | B2* | 5/2019 | Yonemaru | B60R 11/0229 |
| 10,627,872 | B2* | 4/2020 | Shinotou | E05D 3/12 |
| 11,675,396 | B2* | 6/2023 | Yang | H04M 1/0216 361/679.27 |
| 11,773,635 | B2* | 10/2023 | Lin | G06F 1/1601 16/337 |
| 2003/0122046 | A1* | 7/2003 | Huong | F16M 11/10 248/922 |
| 2008/0037206 | A1* | 2/2008 | Huang | F16M 11/10 361/679.06 |
| 2008/0141493 | A1* | 6/2008 | Hsu | F16M 11/10 16/337 |
| 2009/0320240 | A1* | 12/2009 | Wang | G06F 1/1681 16/231 |
| 2011/0099757 | A1* | 5/2011 | Chang | G06F 1/1681 16/297 |
| 2011/0283480 | A1* | 11/2011 | Chang | G06F 1/1681 411/533 |
| 2014/0252181 | A1* | 9/2014 | Mau | E05D 3/12 248/125.1 |
| 2019/0298877 | A1 | 10/2019 | Lane | |
| 2021/0165301 | A1* | 6/2021 | Tang | F16C 11/10 |
| 2022/0372985 | A1* | 11/2022 | Cui | F16C 11/045 |

FOREIGN PATENT DOCUMENTS

| | | |
|---|---|---|
| CN | 207794883 U | 8/2018 |
| JP | S52137270 U | 10/1977 |
| JP | S61138897 U | 8/1986 |
| JP | S62158294 U | 10/1987 |
| JP | H044309 A | 1/1992 |
| JP | 2013108526 A | 6/2013 |

OTHER PUBLICATIONS

The World Intellectual Property Organization (WIPO) International Search Report for PCT/CN2020/104793 Oct. 28, 2020 6 Pages.
Korean Intellectual Property Office (KIPO) The Office Action For KR Application No. 10-2022-7025842 Mar. 18, 2024 12 Pages (Translation Included ).
Japan Patent Office (JPO) Notice of Reasons for refusal For JP Application No. 2023-210107 Dec. 10, 2024 12 Pages (Translation Included ).
Korean Intellectual Property Office (KIPO) The Office Action For KR Application No. 10-2022-7025842 Oct. 25, 2024 11 Pages (Translation Included ).

* cited by examiner

HINGE ASSEMBLY, HOUSEHOLD APPLIANCE, ROTARY DEVICE, AND FAN

CROSS-REFERENCE TO RELATED APPLICATIONS

This application is a National Stage Entry under 35 U.S.C. § 371 of International Application No. PCT/CN2020/104793, filed on Jul. 27, 2020, which claims priority to Chinese Patent application Ser. No. 201922365175.3 filed with China National Intellectual Property Administration on Dec. 25, 2019 and entitled "Hinge Assembly, Household Appliance and Rotary Device," and Chinese Patent Application No. 201922367642.6 filed with China National Intellectual Property Administration on Dec. 25, 2019 and entitled "Fan," the entire contents of all of which are incorporated herein by reference.

FIELD

The present disclosure relates to the technical field of household appliances, in particular to a hinge assembly, a household appliance, a rotary device, and a fan.

BACKGROUND

At present, as shown in FIGS. 1 and 4, a hinge assembly 100' in the related art comprises a fixation seat 102' and two connection walls 104'; as shown in FIGS. 1 and 2, a spacer 108' is provided between the two connection walls 104'; as shown in FIG. 3, a groove is provided at the fixation seat 102', and the two connection walls 104' are provided in the groove and are connected via a bolt 110' and a nut 106'; when assembling, the connection walls 104' need to be installed in an installation groove of the fixation seat 102' in advance, which is cumbersome and inconvenient to install; and as shown in FIG. 5, the fan 200' in the related art achieves rotation of the fan head 204' with respect to the column 202' via a semi-circular arc-shaped fulcrum, resulting in poor stability of the fan head 204'.

SUMMARY

The present disclosure aims to solve at least one of the technical problems existing in the prior art or related technologies.

To this end, a first aspect of the present disclosure provides a hinge assembly.

A second aspect of the present disclosure also provides a household appliance.

A third aspect of the present disclosure also provides a rotary device.

A fourth aspect of the present disclosure also provides a fan.

In view of this, a first aspect of the present disclosure proposes a hinge assembly comprising: a rotation shaft; a first connection member, the first connection member being provided at the rotation shaft; a second connection member, the second connection member being provided at the rotation shaft, the second connection member being located at one side of the first connection member along the axial direction of the rotation shaft, and the second connection member being suitable for rotating around the rotation shaft; and an adjustment member, the adjustment member being connected to the rotation shaft, and the adjustment member being suitable for pressing the second connection member along the axial direction of the rotation shaft.

The present disclosure provides a hinge assembly, comprising a rotation shaft and a first connection member and a second connection member arranged on the rotation shaft, wherein the second connection member is located at one side of the first connection member along the axial direction of the rotation shaft, that is, the second connection member is located at the outer side of the first connection member, so that the first connection member and the second connection member can be sequentially mounted at the rotation shaft, improving the assembly efficiency of a product and enhancing the reliability of the product. At the same time, the first connection member can avoid the second connection member when the second connection member rotates, thereby enabling the second connection member to have a greater rotation angle so as to satisfy different usage scenarios. The hinge assembly further comprises an adjustment member connected to the rotation shaft and being suitable for pressing the second connection member along the axial direction of the rotation shaft, thereby adjusting the axial pressure to which the second connection member is subjected to improve the reliability of the hinge assembly.

According to the above hinge assembly provided in the present disclosure, the following additional technical features can also be provided.

In the above embodiment, furthermore, the adjustment member comprises: a tightening member, wherein the tightening member is located at one end of the rotation shaft, both the rotation shaft and the tightening member are provided with a threaded structure, and the tightening member is in threaded connection with the rotation shaft via the threaded structure; wherein another end of the rotation shaft is further provided with a limit structure, and the first connection member and the second connection member are arranged between the limit structure and the tightening member.

In this embodiment, the adjustment member comprises a tightening member, one end of the rotation shaft is provided with the tightening member, and another end is provided with a limit structure; the first connection member and the second connection member are provided between the limit structure and the tightening member, and the pressing force applied on the second connection member can be adjusted via the tightening member, wherein both the tightening member and the rotation shaft are provided with a threaded structure, and the tightening member is in threaded connection with the rotation shaft via the threaded structure, so that the pressing force applied on the second connection member by the tightening member can be adjusted, and the threaded connection is highly reliable; and when the tightening member is rotated to be removed from the rotation shaft, it facilitates the disassembly and replacement of parts on the rotation shaft.

In any of the above embodiments, furthermore, the adjustment member further comprises: a damping member connected to the rotation shaft, the damping member being provided between the first connection member and the tightening member, and/or the damping member being provided between the second connection member and the first connection member.

In this embodiment, the adjustment member further comprises a damping member, wherein the damping member is connected to the rotation shaft, and the damping member can increase the resistance to the rotation of the second connection member, so that the frictional force generated when the second connection member rotates increases, and the force required for the rotation of the second connection member also increases, thereby improving the stability of the hinge assembly. The damping member may be selectively provided between the first connection member and the tightening member and between the second connection member and the first connection member.

In any of the above embodiments, furthermore, the adjustment member further comprises a spacer connected to the rotation shaft, and a spacer is provided between the second connection member and the limit structure, and/or a spacer is provided between the second connection member and the first connection member, and/or a spacer is provided between the first connection member and the tightening member.

In this embodiment, the adjustment member further comprises a spacer which can be arranged between the two structures to improve the stability of the connection. Herein, a spacer is provided between the second connection member and the limit structure, and/or a spacer is provided between the second connection member and the first connection member, and/or a spacer is provided between the first connection member and the tightening member. In addition, the position and number of the spacers and damping members in the present disclosure can be set at will, while the position and number of the spacers in the related art are limited by the distance between the two connection walls.

In any of the above embodiments, furthermore, an angle of rotation of the second connection member around the rotation shaft is greater than or equal $0°$, and smaller than or equal to $360°$.

In this embodiment, since the second connection member is arranged outside the first connection member, the first connection member can avoid the second connection member when the second connection member rotates, thereby increasing the rotation angle of the second connection member. Specifically, the rotation angle of the second connection member around the rotation shaft is greater than or equal to $0°$, and smaller than or equal to $360°$.

In any of the above embodiments, furthermore, the first connection member is provided with fixation holes, and the number of the fixation holes is at least one.

In this embodiment, a fixation hole is provided at the first connection member, and the first connection member can be fixed via the fixation hole.

In any of the above embodiments, furthermore, the number of the fixation holes is at least three, and the at least three fixation holes are distributed around the circumference of the rotation shaft.

In this embodiment, the number of the fixation holes is at least three, and the at least three fixation holes are distributed around the circumference of the rotation shaft, thereby improving the stability of the first connection member after installation.

In any of the above embodiments, furthermore, the structure of the first connection member is the same as that of the second connection member.

In this embodiment, the structure of the first connection member is the same as the structure of the second connection member, that is, the hinge assembly can use two same structures, thereby improving the versatility of the second connection member and reducing the manufacturing cost.

In any of the above embodiments, furthermore, the number of the first connection members is at least two.

In this embodiment, the number of the first connection members is at least two, the first connection members play a fixing role. On the one hand, the arrangement of the at least two first connection members can improve the fixing strength of the hinge assembly, and on another hand, adding the first connection members can also increase the axial pressing force applied to the second connection members, thereby improving the stability of the hinge assembly.

In any of the above embodiments, furthermore, at least one of the at least two first connection members has the same structure as that of the second connection member.

In this embodiment, the at least one of the at least two first connection members has the same structure as that of the second connection member. That is, in the hinge assembly, the first connection member and the second connection member can be combined so as to form different connection forms and achieve different fixing effects or rotation effects.

In any of the above embodiments, furthermore, the second connection member is located between any two of the at least two first connection members along the axial direction.

In this embodiment, the second connection member is located between any two of the at least two first connection members in the axial direction, so that the two first connection members may extrude the second connection member axially to increase the resistance to rotation of the second connection member.

In any of the above embodiments, furthermore, the second connection member comprises a connection part connected to the rotation shaft; and a mounting part connected to the connection part.

In this embodiment, the second connection member comprises a connection part and a mounting part, wherein the connection part is connected to the rotation shaft, and the mounting part is connected to the connection part for connecting to other structures so as to realize the rotary motion of the other structures.

In any of the above embodiments, furthermore, an included angle is provided between the connection part and the mounting part.

In this embodiment, an included angle is provided between the connection part and the mounting part, and other structures provided at different positions can be connected by changing the included angle, so as to improve the flexibility of the connection of the hinge assembly. Providing an included angle between the mounting part and the connection part can increase the connection area between the second connection member and other structures.

In any of the above embodiments, a reinforcement rib is further provided at a connection between the connection part and the mounting part.

In this embodiment, the reinforcement rib is provided at the connection between the connection part and the mounting part to improve the connection strength between the mounting part and the connection part.

In any of the above embodiments, furthermore, the connection part and the mounting part are of a one-piece structure.

In this embodiment, the connection part and the mounting part are of a one-piece structure, improving the connection strength between the mounting part and the connection part.

In any of the above embodiments, furthermore, a clearance hole is provided at the connection part, and the clearance hole is adapted to communicate with the fixation hole of the first connection member in the axial direction of the rotation shaft.

In this embodiment, the clearance hole is adapted to communicate with the fixation hole of the first connection member in the axial direction of the rotation shaft, so that the fixation hole can be connected via the clearance hole to fix the hinge assembly when the fixation hole is located behind the second connection member.

According to a second aspect of the present disclosure, there is also provided a household appliance comprising: a hinge assembly described in any one of the above embodiments.

The household appliance according to the second aspect of the present disclosure has all the advantageous effects of the hinge assembly by comprising the hinge assembly according to any one of the above embodiments.

In the above embodiment, furthermore, the household appliance comprises a fan or an air conditioner.

In this embodiment, the household appliance comprises a fan or an air conditioner.

In the above embodiment, furthermore, the fan comprises: a column assembly; a fan head, one of the second connection member and the first connection member being connected to the fan head, and another of the second connection member and the first connection members being connected to the column assembly.

In this embodiment, the hinge assembly can be used for the fan to realize the adjustment of the pitch angle of the fan, and also the adjustment of the yaw angle of the fan. Specifically, one of the second connection member and the first connection member is connected to the fan head, and another of the second connection member and the first connection member is connected to the column assembly, thereby enabling adjustment of the pitch angle or the yaw angle of the fan head.

According to a third aspect of the present disclosure, there is also provided a rotary device comprising: a hinge assembly described in any of the above embodiments of the first aspects.

The rotary device according to the third aspect of the present disclosure has all the advantageous effects of the hinge assembly by comprising the hinge assembly described in any of the above embodiments of the first aspect.

A fourth aspect of the present disclosure proposes a fan, comprising: a column assembly; a fan head; a hinge assembly comprising a rotation shaft and a first connection member and a second connection member provided at the rotation shaft, wherein the first connection member is connected to the column assembly, the second connection member is connected to the fan head, and the second connection member is suitable for rotating around the rotation shaft; wherein the rotation shaft is located at the middle portion of one end of the column assembly near to the fan head.

The fan provided in the present disclosure comprises a column assembly and a fan head, wherein the column assembly and the fan head are connected via a hinge assembly; the hinge assembly comprises a rotation shaft and a first connection member and a second connection member provided at the rotation shaft; the first connection member is connected to the column assembly, the second connection member is connected to the fan head, and the first connection member and the second connection member can rotate around the rotation shaft, thereby realizing the rotation of the fan head and further realizing the adjustment of the air outlet angle of the fan head; and meanwhile, the rotation shaft of the hinge assembly is located at the end of the column assembly, that is to say, the hinge assembly is connected to the back of the fan head and the column assembly. On the one hand the stability of the fan head is improved, and on another hand the fan is made more aesthetically pleasing. Furthermore, the pivot shaft is located at the middle portion of one end of the column assembly near to the fan head to enable greater angular rotation of the fan head during rotation and thus greater adjustment of the pitch angle.

According to the above fan provided in the present disclosure, the following additional technical features can also be provided.

In the above aspect, furthermore, an axis around which the first connection member and the second connection member rotate relative to each other is perpendicular to the length direction of the column assembly.

In this embodiment, the axis around which the first connection member and the second connection member rotate relative to each other is perpendicular to the length direction of the column assembly, i.e., the adjustment of the pitch angle of the fan head is achieved, thereby enlarging the air outlet area of the fan.

In any of the above embodiments, furthermore, the fan head comprises a drive shaft and fan blades provided at the drive shaft; wherein the axis center of the rotation shaft coincides with the axis of the drive shaft.

In this embodiment, the fan head comprises a drive shaft and fan blades, wherein the drive shaft drives the fan blades to rotate to exhaust air to the outside, and the fan blades surround the peripheral side of the drive shaft, so that the drive shaft is located at the middle portion of the fan; the axis of the rotation shaft coincides with the axis of the drive shaft, that is to say, the axis of the drive shaft passes through the axis of the rotation shaft, so that during the rotation of the fan head, the end of the column assembly always corresponds to the center of the fan head. Therefore, the fan head will not be eccentric during the rotation, thereby improving the stability of the fan head. Meanwhile, since the fan head will not be eccentric during the rotation, the fan head can be rotated by a larger angle.

In any of the above embodiments, furthermore, a limit member is provided at the limit member, the fan head and/or the column assembly; wherein the limit member is adapted to limit rotation of the fan head between the first position and the second position.

In this embodiment, the range of rotation of the fan head can be limited by providing a limit member such that the fan head rotates between a first position and a second position.

In any of the above embodiments, furthermore, the angle at which the fan head rotates towards the lower part of the fan from the horizontal position to the first position is greater than or equal to 0°, and smaller than or equal to 6°; the angle at which the fan head rotates towards the upper part of the fan from the horizontal position to the second position is greater than or equal to 0° and smaller than or equal to 90°; wherein the horizontal position is located between the first position and the second position; and when the fan head is in the horizontal position, the axis of the drive shaft is perpendicular to the length direction of the column assembly.

In this embodiment, the horizontal position is located between a first position and a second position, and the fan head can move from the horizontal position to the first position and the second position respectively. When the fan head is located at the horizontal position, the axis of the drive shaft is perpendicular to the length direction of the column assembly, that is to say, when the fan head is located at the horizontal position, the air outlet direction of the fan is in the horizontal direction or approximately in the horizontal direction, wherein the adjustment of the pitch angle of the fan head can be achieved by means of the hinge assembly, and the rotation angle of the fan head towards the lower part of the fan from the horizontal position to the first position is greater than or equal to 0°, and smaller than or equal to 6°. That is, the pitch angle of the fan head moving downward from the horizontal position is greater than or equal to 0°, and smaller than or equal to 6°. The angle of the fan head rotating towards the upper part of the fan from the horizontal position to the second position is greater than or equal to 0°, and smaller than or equal to 90°. That is, the elevation angle of the fan head moving upward from the horizontal position is greater than or equal to 0°, and smaller than or equal to 90°. That is, the fan head can achieve a pitch angle of 6° and an elevation angle of 90°, which expands the blowing range of the fan.

In any of the above embodiments, furthermore, the hinge assembly further comprises: a tightening member, wherein the tightening member is provided at a rotation shaft and is located at one end of the rotation shaft, both the rotation shaft and the tightening member are provided with a threaded structure, and the tightening member is in threaded connection with the rotation shaft via the threaded structure; wherein another end of the rotation shaft is further provided with a limit structure, and the first connection member and the second connection member are located between the limit structure and the tightening member.

In this embodiment, one end of the rotation shaft is provided with the tightening member, and another end is provided with a limit structure; the first connection member and the second connection member are provided between the limit structure and the tightening member, and the pressing force applied on the second connection member can be adjusted via the tightening member, wherein both the tightening member and the rotation shaft are provided with a threaded structure, and the tightening member is in threaded connection with the rotation shaft via the threaded structure, so that the pressing force applied on the second connection member by the tightening member can be adjusted, and the threaded connection is highly reliable; and when the tightening member is rotated to be removed from the rotation shaft, it facilitates the disassembly and replacement of parts on the rotation shaft.

In any of the above embodiments, furthermore, the hinge assembly further comprises: a damping member provided at the rotation shaft, and a damping member provided between the first connection member and the tightening member.

In this embodiment, the damping member is connected to the rotation shaft, and the damping member can increase the resistance to the rotation of the second connection member, so that the frictional force generated when the second connection member rotates increases, and the force required for the rotation of the second connection member also increases, thereby improving the stability of the hinge assembly. The damping member may be selectively provided between the first connection member and the tightening member and between the second connection member and the first connection member.

In any of the above embodiments, furthermore, a spacer is provided at the rotation shaft, a spacer is provided between the second connection member and the limit structure, and/or a spacer is provided between the first connection member and the second connection member, and/or a spacer is provided between the first connection member and the tightening member.

In this embodiment, the spacer may be provided between the two structures to improve the stability of the connection. Herein, a spacer is provided between the second connection member and the limit structure, and/or a spacer is provided between the second connection member and the first connection member, and/or a spacer is provided between the first connection member and the tightening member.

In any of the above embodiments, furthermore, the damping member comprises any one or a combination of an elastic pad, a viscous damping member, and an idler.

In this embodiment, the damping member comprises any one or a combination of an elastic pad, a viscous damping member, and an idler to improve the stability of the hinge assembly.

In any of the above embodiments, furthermore, a limit surface is formed on at least part of the rotation shaft along the axial direction of the rotation shaft; and the spacer is provided with a through hole, and the shape of the cross section of the through hole is adapted to the shape of the cross section of a portion of the rotation shaft provided with the limit surface.

In this embodiment, a limit surface is formed on the rotation shaft along the axial direction of the rotation shaft, and the cross section of the through hole of the spacer is adapted to the shape of the portion of the rotation shaft provided with the limit surface, so that the spacer cannot rotate along the rotation shaft, thereby improving the stability of the hinge assembly.

In any of the above embodiments, furthermore, the number of the limit surfaces is at least two, and at least two of the limit surfaces are oppositely arranged along the circumferential direction of the axis of the rotation shaft.

In this embodiment, at least two limit surfaces are oppositely arranged along the circumferential direction of the axis of the rotation shaft, which improves the limiting effect of the limit surfaces.

In any of the above embodiments, furthermore, the number of the second connection members is at least two, a mounting groove is provided at the first connection member, and two of the at least two second connection members are provided in the mounting groove.

In this embodiment, there are at least two second connection members, thereby improving the connection strength between the hinge assembly and the fan head; and meanwhile, the two second connection members are arranged in the mounting groove of the first connection member, improving the connection strength of the hinge assembly, and preventing the second connection member from falling off.

In any of the above embodiments, furthermore, the second connection member is provided at one side of the first connection member along the axial direction of the rotation shaft.

In this embodiment, the second connection member is located at one side of the first connection member along the axial direction of the rotation shaft, that is, the second connection member is located at the outer side of the first connection member, so that the first connection member and the second connection member can be sequentially mounted at the rotation shaft, improving the assembly efficiency of a product and enhancing the reliability of the product. At the same time, the first connection member can avoid the second connection member when the second connection member rotates, thereby enabling the second connection member to have a greater rotation angle so as to satisfy different usage scenarios.

In any of the above embodiments, furthermore, the fan head further comprises a motor housing, wherein a drive shaft and a fan blade are provided in the motor housing; wherein a wire passing member is provided at the motor housing, and the fan further comprises a wire passing member adapted for the connection wire to pass through.

In this embodiment, the fan head further comprises a motor housing, a motor is provided in the motor housing, the motor comprises a drive shaft, and a fan blade is connected to the drive shaft, wherein a wire passing member is provided at the motor housing, the fan further comprises a connection wire, and the connection wire passes through a gap between two second connection members via a column assembly and is then connected to the motor via the wire passing member, so that the wiring is more reasonable.

In any of the above embodiments, furthermore, the column assembly comprises a column; and a bracket provided at one end of the column close to the fan head, the first connection member being connected to the bracket.

In this embodiment, the column assembly comprises a column and a bracket, wherein the bracket is provided at the end of the column, and then the first connection member is mounted at the end of the column via the bracket, so as to realize the fixing of the hinge assembly.

Additional aspects and advantages of the disclosure will be apparent from the following description, or may be learned by practice of the disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

Figure 1:
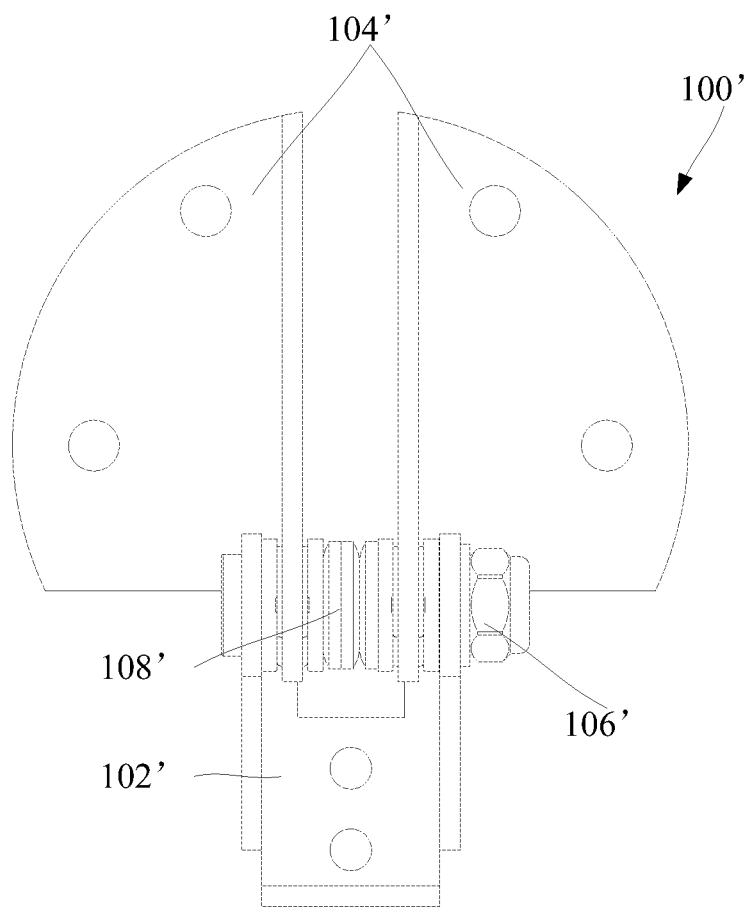
FIG. 1 is a schematic structural diagram of a hinge assembly according to an embodiment of the related art.
Figure 2:
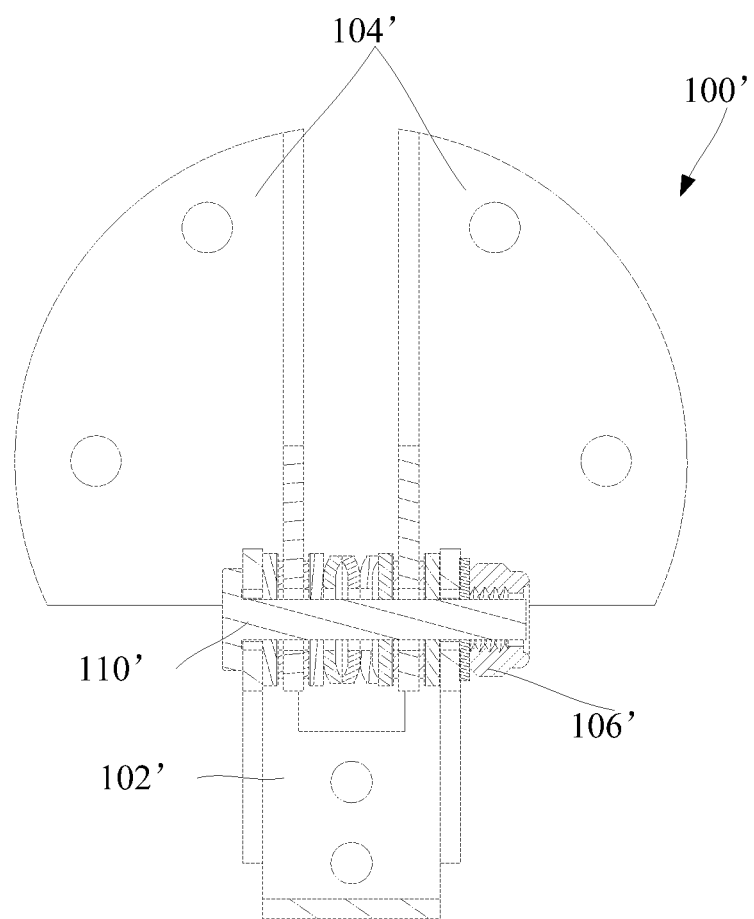
FIG. 2 is another schematic structural diagram of a hinge assembly according to an embodiment of the related art.
Figure 3:
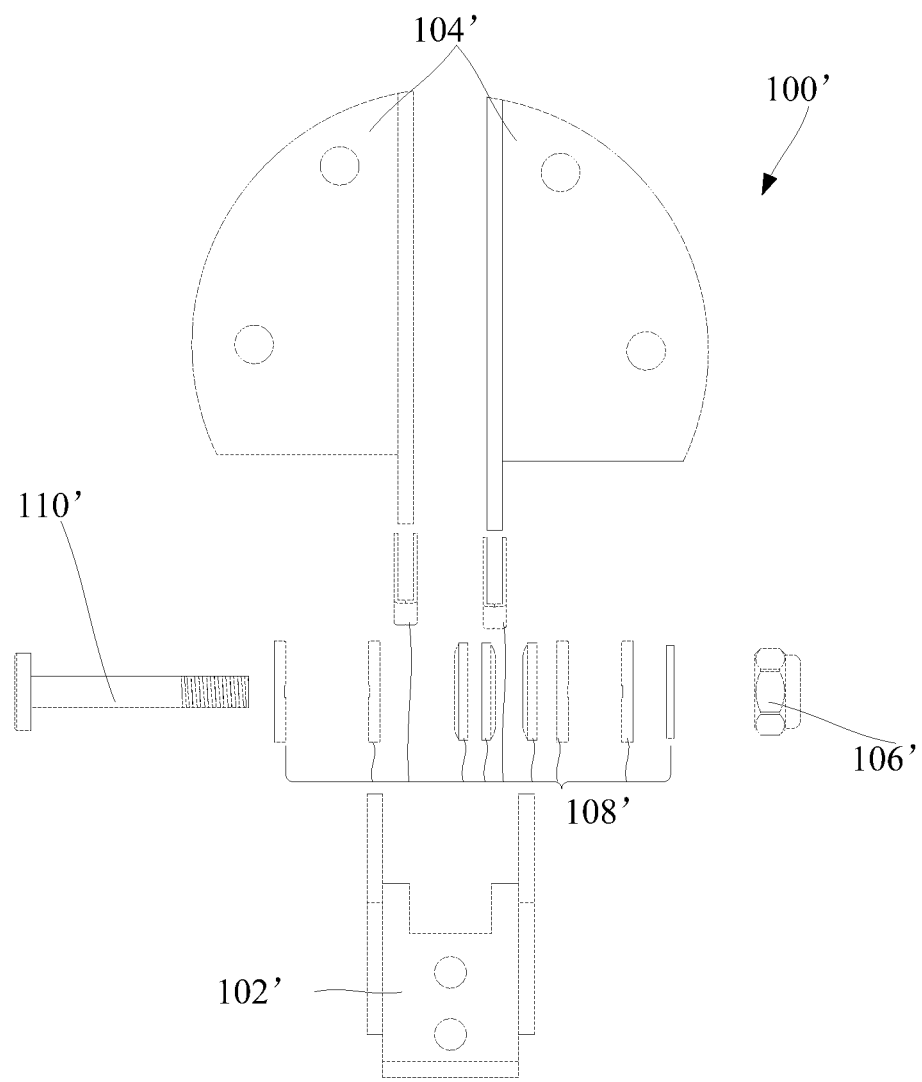
FIG. 3 is an exploded structural diagram of a hinge assembly according to an embodiment of the related art.
Figure 4:
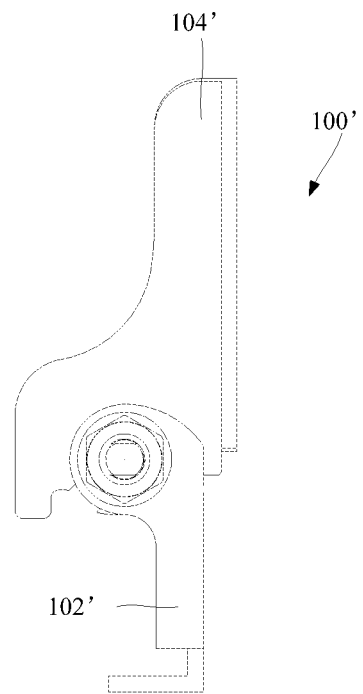
FIG. 4 is a yet another schematic structural diagram of a hinge assembly according to an embodiment of the related art.
Figure 5:
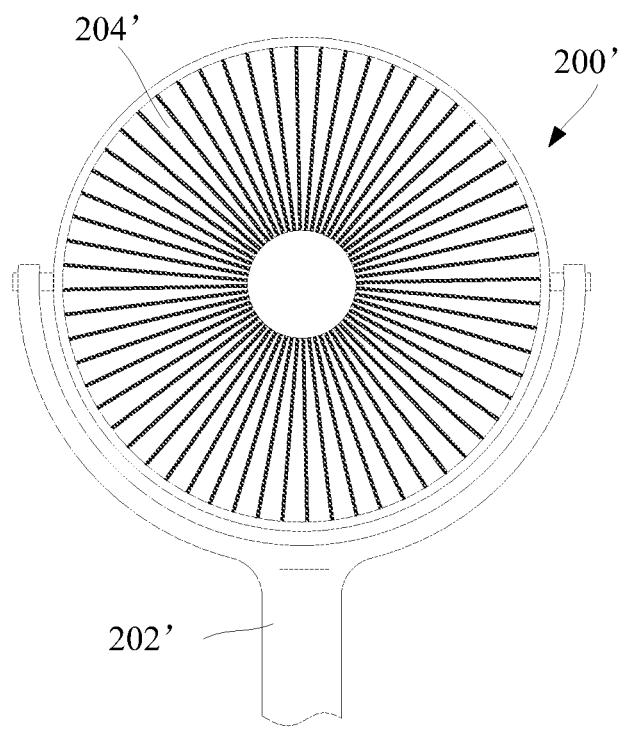
FIG. 5 is a schematic structural diagram of a fan of the related art.

In the drawings, the corresponding relationship between the reference numerals and the component names in FIGS. 1 to 5 is as follows:

100' hinge assembly, 102' fixation seat, 104' connection wall, 106' nut, 108' spacer, 110' bolt, 200' fan, 202' column, 204' fan head.

Figure 6:
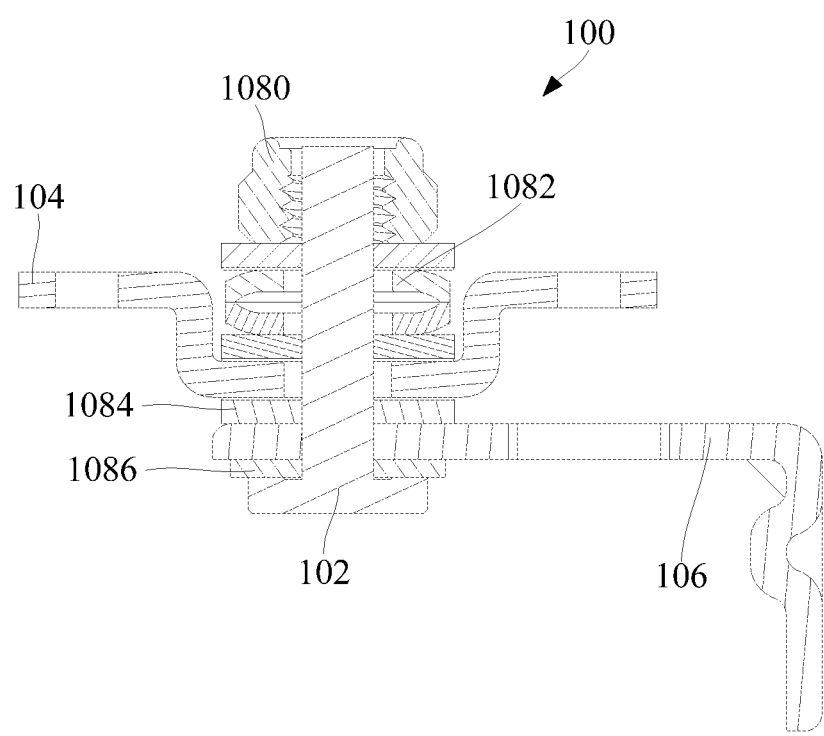

FIG. 6 is a schematic structural diagram of a hinge assembly according to an embodiment of the present disclosure.

Figure 7:
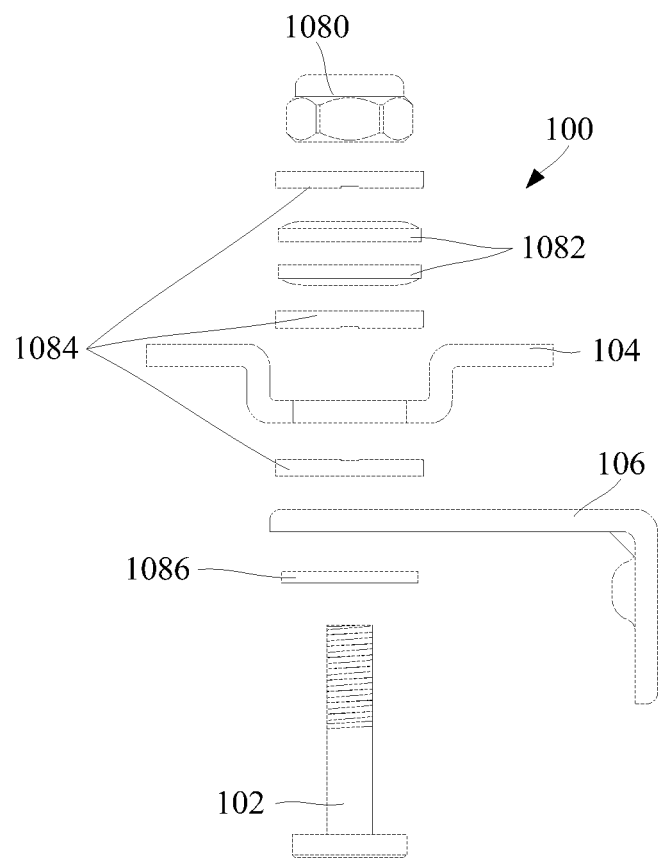

FIG. 7 is an exploded structural diagram of a hinge assembly of an embodiment of the present disclosure.

Figure 8:
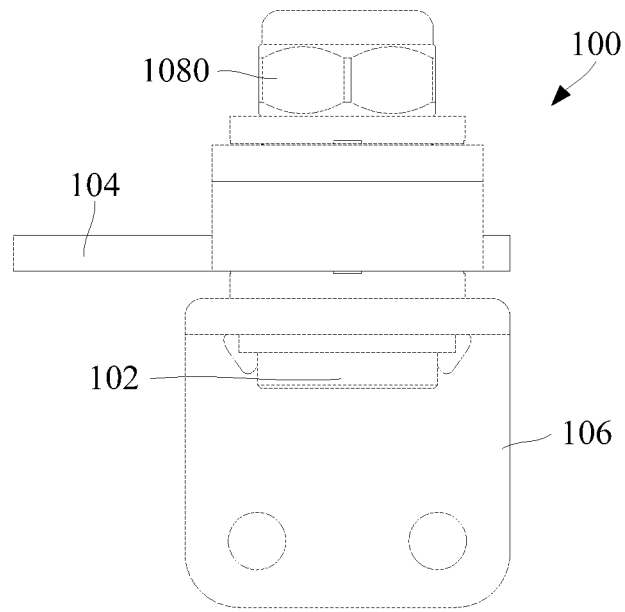

FIG. 8 is another schematic structural diagram of a hinge assembly according to an embodiment of the present disclosure.

Figure 9:
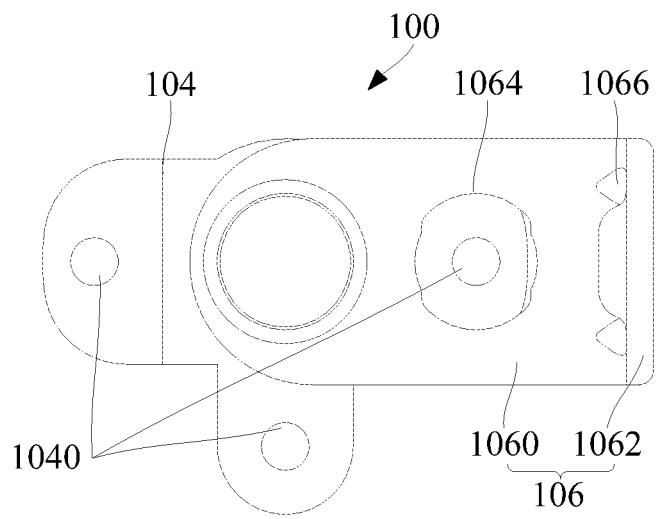

FIG. 9 is yet another schematic structural diagram of a hinge assembly according to an embodiment of the present disclosure.

Figure 10:
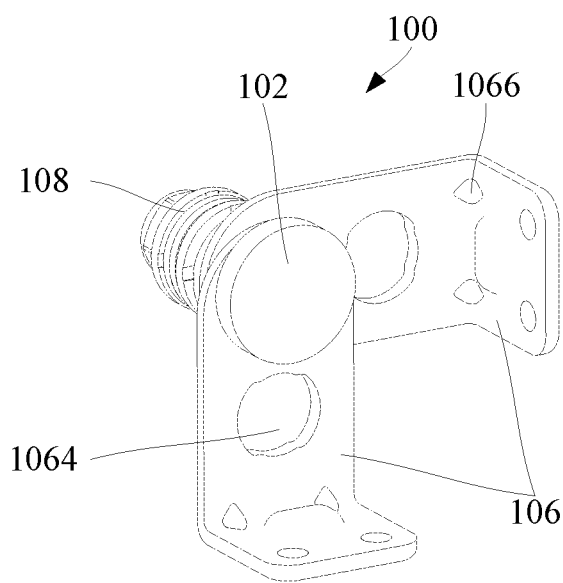

FIG. 10 is a schematic structural diagram of a hinge assembly of a specific embodiment of the present disclosure.

Figure 11:
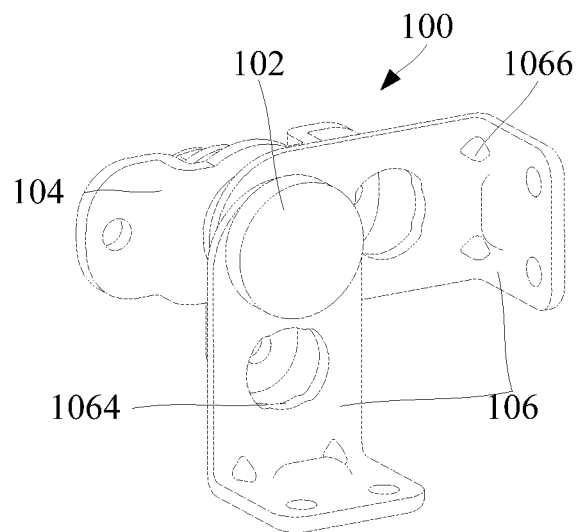

FIG. 11 is a schematic structural diagram of a hinge assembly according to another embodiment of the present disclosure.

Figure 12:
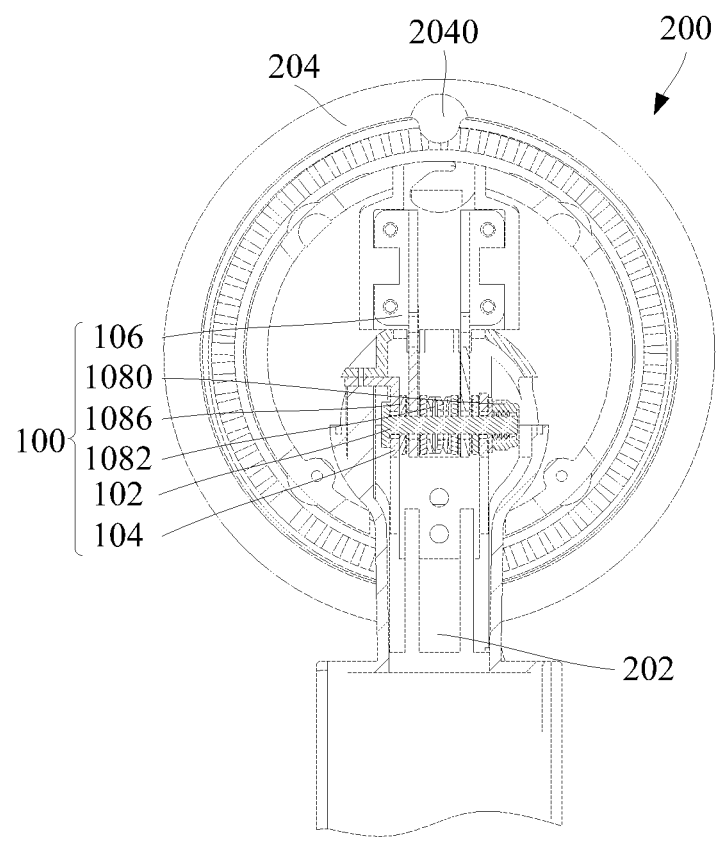

FIG. 12 is a schematic structural diagram of a fan of an embodiment of the present disclosure.

Figure 13:
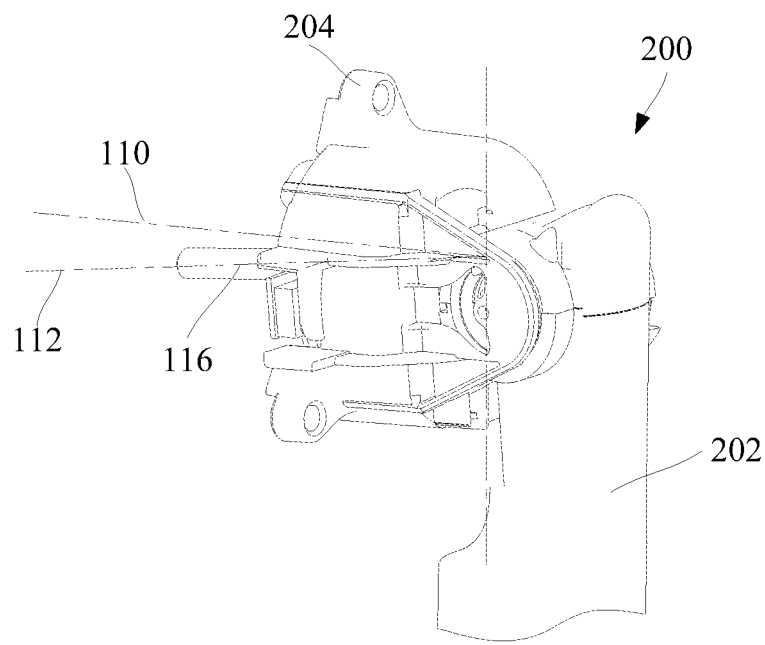

FIG. 13 is another schematic structural diagram of a fan of an embodiment of the present disclosure.

Figure 14:
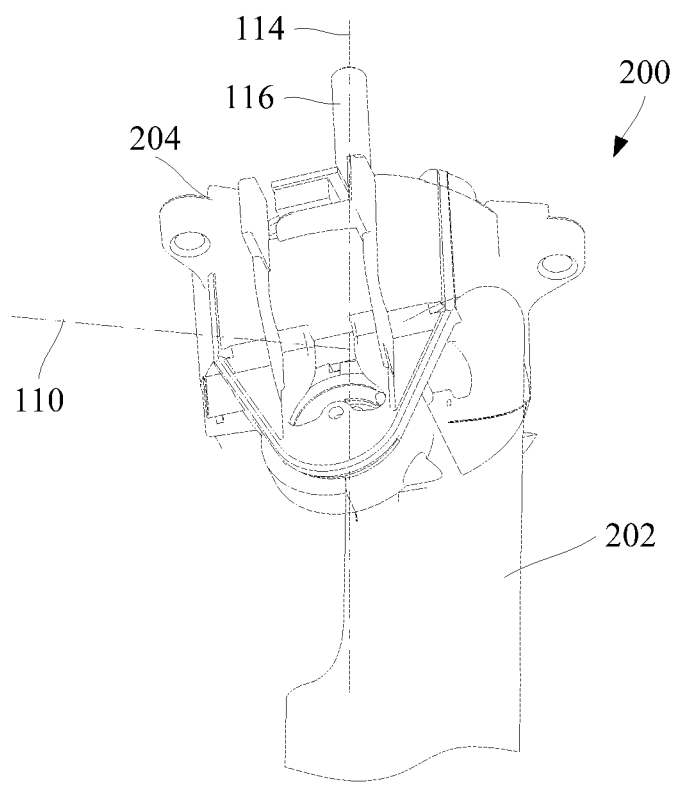

FIG. 14 is yet another schematic structural diagram of a fan of an embodiment of the present disclosure.

In the drawings, the corresponding relationship between the reference numerals and the component names in FIGS. 6 to 14 is as follows:

100 hinge assembly, 102 rotation shaft, 104 first connection member, 1040 fixation hole, 106 second connection member, 1060 connection part, 1062 mounting part, 1064 clearance hole, 1066 reinforcement rib, 108 adjustment member, 1080 tightening member, 1082 elastic pad, 1084 friction plate, 1086 spacer, 200 fan, 202 column assembly, 204 fan head, 2040 wire passing part, 110 horizontal position, 112 first position, 114 second position, 116 drive shaft.

DETAILED DESCRIPTION OF THE DISCLOSURE

In order that the above objects, features and advantages of the present disclosure may be more clearly understood, the present disclosure is described in further detail below with reference to the accompanying drawings and detailed description. It should be noted that the embodiments and the features in the embodiments herein may be combined with one another without conflict.

In the following description, numerous specific details are set forth in order to provide a thorough understanding of the present disclosure. However, the present disclosure may be practiced otherwise than as described herein. Therefore, the scope of the present disclosure is not limited to the specific embodiments disclosed below.

Hinge assemblies 100, household appliances, and rotary devices according to some embodiments of the present disclosure are described below with reference to FIGS. 6 to 14.

Embodiment 1

As shown in FIG. 6, according to an embodiment of the first aspect of the present disclosure, the present disclosure proposes a hinge assembly 100 comprising a rotation shaft 102, a first connection member 104 and a second connection member 106.

Specifically, the first connection member 104 and the second connection member 106 are both provided at the rotation shaft 102, the second connection member 106 is located at one side of the first connection member 104 along the axial direction of the rotation shaft 102, and the second connection member 106 is suitable for rotating around the rotation shaft 102; an adjustment member 108, the adjustment member 108 being connected to the rotation shaft 102, and the adjustment member 108 being suitable for pressing the second connection member 106 along the axial direction of the rotation shaft 102.

The hinge assembly 100 provided in the present disclosure comprises a rotation shaft 102, and a first connection member 104 and a second connection member 106 arranged on the rotation shaft 102, wherein the second connection member 106 is located at one side of the first connection member 104 along the axial direction of the rotation shaft 102, that is, the second connection member 106 is located at the outer side of the first connection member 104, so that the first connection member 104 and the second connection member 106 can be sequentially mounted at the rotation shaft 102, improving the assembly efficiency of the product and enhancing the reliability of the product. At the same time, the first connection member 104 can avoid the second connection member 106 when the second connection member 106 rotates, thereby enabling the second connection member 106 to have a greater rotation angle so as to satisfy different usage scenarios. The hinge assembly 100 further comprises an adjustment member 108 connected to the rotation shaft 102 and being suitable for pressing the second connection member 106 along the axial direction of the rotation shaft 102, thereby adjusting the axial pressure to which the second connection member 106 is subjected to improve the reliability of the hinge assembly 100.

Specifically, the adjustment member 108 extrudes the second connection member 106 along the axial direction of the rotation shaft 102, and the magnitude of the axial pressure against the second connection member 106 can be adjusted. The greater the axial pressure received by the second connection member 106, the greater the resistance received by the second connection member 106 when it rotates, and thus the greater the force required enabling the second connection member 106 to rotate around the rotation shaft 102. Therefore, the magnitude of the force required for the second connection member 106 to rotate can be adjusted by the adjustment member 108. At the same time, by adjusting the axial pressure received by the second connection member 106, the frictional force between the second connection member 106 and the adjacent components can be adjusted, that is to say, the greater the axial pressure received by the second connection member 106, the greater the frictional force between the second connection member 106 and the adjacent structure. When the frictional force is brought against the force applied to the second connection member 106 to rotate around the second connection member 106, the second connection member 106 is fixed at a designated position, and thus the member connected to the second connection member 106 is fixed at a designated position without random rotation, thereby improving the reliability of the hinge assembly 100. It will be appreciated that the resistance to rotation of the second connection member 106 comprises frictional forces generated between the second connection member 106 and components axially adjacent to the second connection member 106.

Specifically, the first connection member 104 and the second connection member 106 can be sheathed on the rotation shaft 102 in the direction of gravity in sequence, with easy assembly, and the distance between the first connection member 104 and the second connection member 106 along the axial direction of the rotation shaft 102 can be freely adjusted, improving the versatility of the hinge assembly 100.

Specifically, the first connection member 104 is rotatable about the rotation shaft 102, or the first connection member 104 is fixed to the rotation shaft 102.

Specifically, the first connection member 104 is fixed to the rotation shaft 102, and the rotation shaft 102 can be fixed by the first connection member 104.

Embodiment 2

As shown in FIGS. 6 and 8, an embodiment of the present disclosure comprises the features defined by the embodiments described above, and furthermore, the adjustment member 108 comprises a tightening member 1080.

Specifically, as shown in FIG. 8, the tightening member 1080 is located at one end of the rotation shaft 102, the rotation shaft 102 and the tightening member 1080 are both provided with a threaded structure, and the tightening member 1080 is in threaded connection with the rotation shaft 102 via the threaded structure; wherein another end of the rotation shaft 102 is further provided with a limit structure, and the first connection member 104 and the second connection member 106 are provided between the limit structure and the tightening member 1080.

In this embodiment, the adjustment member 108 comprises a tightening member 1080, one end of the rotation shaft 102 is provided with the tightening member 1080, and another end is provided with a limit structure; the first connection member 104 and the second connection member 106 are provided between the limit structure and the tightening member 1080, and the pressing force applied on the second connection member 106 can be adjusted via the tightening member 1080, wherein both the tightening member 1080 and the rotation shaft 102 are provided with a threaded structure, and the tightening member 1080 is threadedly connected with the rotation shaft 102 via the threaded structure, so that the pressing force applied on the second connection member 106 by the tightening member 1080 can be adjusted, and the threaded connection is highly reliable; and when the tightening member 1080 is rotated to be removed from the rotation shaft 102, it facilitates the disassembly and replacement of parts on the rotation shaft 102.

Specifically, the rotation shaft 102 and the limit structure provided at the end of the rotation shaft 102 are of a one-piece structure, the rotation shaft 102 comprises a bolt or a screw, and the tightening member 1080 comprises a nut.

Embodiment 3

As shown in FIG. 7, an embodiment of the present disclosure comprises the features defined by the embodiments described above, and furthermore, the adjustment member 108 further comprises a damping member.

Specifically, a damping member is connected to the rotation shaft 102, a damping member is provided between the first connection member 104 and the tightening member 1080, and/or a damping member is provided between the second connection member 106 and the first connection member 104.

In this embodiment, the adjustment member 108 further comprises a damping member, wherein the damping member is connected to the rotation shaft 102, and the damping member can increase the resistance to rotation of the second connection member 106, so that the frictional force generated when the second connection member 106 rotates increases, and the force required for the rotation of the second connection member 106 also increases, thereby improving the stability of the hinge assembly 100. The damping member may be selectively provided between the first connection member 104 and the tightening member 1080, and between the second connection member 106 and the first connection member 104.

Specifically, the amount of force required to rotate the second connection member 106 can be adjusted by adding or subtracting the damping members. For example, the resistance to rotation of the second connection member 106 can be increased by adding a damping member when the tightening member 1080 is screwed on the same position of the rotation shaft 102, thereby increasing the force required to rotate the second connection member 106, i.e., if the second connection member is required to rotate, a greater force is required to be applied; and when the resistance to rotation of the second connection member 106 is greater than or equal to the force applied to the second connection member 106 by other structures or people, the current state of the hinge assembly 100 can be maintained, i.e., the second connection member 106 can be kept stationary, thereby improving the stability of the hinge assembly 100.

Specifically, other structures other than the hinge assembly 100, comprising a fan head of a fan or a column assembly of a fan, may be connected to the second connection member 106, and a force may be applied to the second connection member 106 in a rotation direction of the second connection member 106, so that the hinge assembly 100 and another structures mounted at the second connection member 106 are maintained in a current state when the resistance to the rotation of the second connection member 106 is greater than or equal to the force applied to the second connection member 106 by another structures, thereby improving the stability of the second connection member 106 and another structures connected to the second connection member 106.

Furthermore, as shown in FIG. 7, the damping member comprises an elastic pad 1082 and a friction plate 1084. In the axial direction, two sides of the first connection member 104 are provided with the friction plates 1084, an elastic pad 1082 is provided at one side of the first connection member 104 facing the tightening member 1080, and two axial sides of the elastic pad 1082 are respectively provided with friction plates the 1084.

Embodiment 4

As shown in FIG. 7, an embodiment of the present disclosure comprises the features defined by the embodiments described above, and furthermore, the adjustment member 108 also comprises a spacer 1086.

Specifically, a spacer 1086 is connected to the rotation shaft 102, a spacer 1086 is provided between the second connection member 106 and the limit structure, and/or a spacer 1086 is provided between the second connection member 106 and the first connection member 104, and/or a spacer 1086 is provided between the first connection member 104 and the tightening member 1080.

In this embodiment, the adjustment member 108 also comprises a spacer 1086 which can be arranged between the two structures to improve the stability of the connection. Herein, a spacer 1086 is provided between the second connection member 106 and the limit structure, and/or a spacer 1086 is provided between the second connection member 106 and the first connection member 104, and/or a spacer 1086 is provided between the first connection member 104 and the tightening member 1080. In addition, the position and number of the spacers 1086 and the damping members in the present disclosure can be set at will, while the position and number of the spacers 1086 in the related art are limited by the distance between the two connection walls.

Specifically, both ends of the spacer 1086 abut against other structures in the axial direction of the rotation shaft 102, i.e., the spacer 1086 may extrude the structures on both sides, thereby increasing the force required to rotate the structures on both sides of the spacer 1086 and improving the stability of the hinge assembly 100.

Embodiment 5

According to an embodiment of the present disclosure, it comprises the features as defined in any of the above embodiments, and furthermore, the angle of rotation of the second connection member 106 around the rotation shaft 102 is greater than or equal to 0°, and smaller than or equal to 360°.

In this embodiment, since the second connection member 106 is arranged outside the first connection member 104, the first connection member 104 can avoid the second connection member 106 when the second connection member 106 rotates, thereby increasing the rotation angle of the second connection member 106. Specifically, the angle of rotation of the second connection member 106 around the rotation shaft 102 is greater than or equal to 0°, and smaller than or equal to 360°.

Specifically, at least a portion of the first connection member 104 avoids the second connection member 106 in the circumferential direction of the rotation shaft 102.

Embodiment 6

According to an embodiment of the present disclosure, it comprises the features as defined in any of the above embodiments, and furthermore, the first connection member 104 is provided with fixation holes 1040, and the number of the fixation holes 1040 is at least one.

In this embodiment, a fixation hole 1040 is provided at the first connection member 104, and the first connection member 104 can be fixed via the fixation hole 1040.

Specifically, the hinge assembly 100 comprises a screw adapted to be threaded into the fixation hole 1040 to secure the first connection member 104.

Of course, it is also possible to fix the first connection member 104 by snap-fitting a block into the fixation hole 1040.

Furthermore, as shown in FIG. 9, the number of the fixation holes 1040 is at least three, and the at least three fixation holes 1040 are distributed around the circumference of the rotation shaft 102.

In this embodiment, the number of the fixation holes 1040 is at least three, and the at least three fixation holes 1040 are distributed around the circumference of the rotation shaft 102 to improve the stability of the first connection member 104 after installation.

Specifically, the at least three fixation holes 1040 are distributed around the circumference of the rotation shaft 102 such that the at least three fixation holes 1040 are arranged non-collinearly to form a three-point fixing, that is, the three non-collinearly arranged fixation holes 1040 form a triangular connection, thereby improving the stability of the first connection member 104 after installation.

Specifically, the at least three fixation holes 1040 are uniformly distributed along the circumferential direction of the rotation shaft 102.

Specifically, the number of the fixation holes 1040 is three, and the included angle between two adjacent connecting lines in the connecting lines between the three fixation holes 1040 and the axis center of the rotation shaft 102 is 90°.

Embodiment 7

As shown in FIG. 10, according to an embodiment of the present disclosure, it comprises the features defined in any of the above embodiments, and furthermore, the structure of the first connection member 104 is the same as that of the second connection member 106.

In this embodiment, the structure of the first connection member 104 is the same as the structure of the second connection member 106, that is, the hinge assembly 100 may use two identical structures, thereby increasing the versatility of the second connection member 106 and reducing manufacturing costs.

Embodiment 8

According to an embodiment of the present disclosure, it comprises the features defined by the embodiments described above, and furthermore, the number of the first connection members 104 is at least two.

In this embodiment, the number of the first connection members 104 is at least two, the first connection members 104 play a fixing role. On one hand, the arrangement of the at least two first connection members 104 can improve the fixing strength of the hinge assembly 100, and on another hand, adding the first connection members 104 can also increase the axial pressing force applied to the second connection members 106, thereby improving the stability of the hinge assembly 100.

Furthermore, as shown in FIG. 11, at least one of the at least two first connection members 104 has the same structure as that of the second connection member 106.

In this embodiment, the structure of at least one of the at least two first connection members 104 is the same as the structure of the second connection member 106, that is, the first connection member 104 and the second connection member 106 in the hinge assembly 100 may be combined to form different connection forms for different fixing effects or rotation effects.

Specifically, the first connection member 104 of the at least two first connection members 104 having the same structure as the second connection member 106 serves as a fixing structure for fixing the rotation shaft 102, that is, the first connection member 104 of the at least two first connection members 104 having the same structure as the second connection member 106 is fixedly connected to the rotation shaft 102.

Specifically, the parts fixedly connected to the rotation shaft 102 may be welded to the rotation shaft 102, or a tangential surface in the axial direction may be provided at the rotation shaft 102 at a mating portion. For example, the portion of the rotation shaft 102 that mates with the spacer 1086 is provided with a tangential surface in the axial direction, and the through hole of the spacer 1086 is shaped to fit with the rotation shaft 102 having the tangential surface portion, thereby preventing the spacer 1086 from rotating on the rotation shaft 102.

Furthermore, in the axial direction, the second connection member 106 is located between any two of the at least two first connection members 104.

In this embodiment, the second connection member 106 is located between any two of the at least two first connection members 104 in the axial direction such that the two first connection members 104 may extrude the second connection member 106 axially to increase the resistance to rotation of the second connection member 106.

Embodiment 9

As shown in FIG. 9, according to an embodiment of the present disclosure, it comprises the features defined in any of the above embodiments, and furthermore, the second connection member 106 comprises a connection part 1060 connected to the rotation shaft 102; and a mounting part 1062 connected to the connection part 1060.

In this embodiment, the second connection member 106 comprises a connection part 1060 connected to the rotation shaft 102 and a mounting part 1062 connected to the connection part 1060 for connecting to other structures to realize rotational movement of the other structures.

Furthermore, as shown in FIG. 10, there is an included angle between the connection part 1060 and the mounting part 1062.

In this embodiment, there is an included angle between the connection part 1060 and the mounting part 1062, and the flexibility of connection of the hinge assembly 100 may be increased by changing the angle of the included angle to connect other structures disposed at different locations. In addition, providing an included angle between the mounting part 1062 and the connection part 1060 can increase the connection area between the second connection member 106 and other structures.

Specifically, the connection part 1060 and the mounting part 1062 are plate-shaped, and an included angle between the connection part 1060 and the mounting part 1062 can increase the connection area between the mounting part 1062 and other structures, and can improve the connection strength.

Furthermore, as shown in FIG. 11, a reinforcement rib 1066 is provided at the connection of the connection part 1060 and the mounting part 1062.

In this embodiment, the reinforcement rib 1066 is provided at the connection of the connection part 1060 and the mounting part 1062 to improve the strength of the connection between the mounting part 1062 and the connection part 1060.

Furthermore, the connection part 1060 and the mounting part 1062 are of a one-piece structure.

In this embodiment, the connection part 1060 and the mounting part 1062 are of a one-piece structure, improving the strength of the connection between the mounting part 1062 and the connection part 1060.

Specifically, the second connection member 106 is bent to form an included angle between the connection part 1060 and the mounting part 1062.

Furthermore, as shown in FIG. 9, the connection part 1060 is provided with a clearance hole 1064 adapted to communicate with the fixation hole 1040 of the first connection member 104 along the axial direction of the rotation shaft 102.

In this embodiment, the clearance hole 1064 is adapted to communicate with the fixation hole 1040 of the first connection member 104 in the axial direction of the rotation shaft 102, so that the fixation hole 1040 can be connected via the clearance hole 1064 to fix the hinge assembly 100 when the fixation hole 1040 is located behind the second connection member 106.

Embodiment 10

As shown in FIGS. 6 and 8, according to a specific embodiment of the present disclosure, the hinge assembly 100 comprises a rotation shaft 102, and a first connection member 104 and a second connection member 106 arranged on the rotation shaft 102, wherein the second connection member 106 is located at one side of the first connection member 104 along the axial direction of the rotation shaft 102, and the second connection member 106 is suitable for rotating around the rotation shaft 102; the hinge assembly 100 further comprises a tightening member 1080, an elastic pad 1082 and a spacer 1086, wherein the tightening member 1080 is arranged at one end of the rotation shaft 102, and another end of the rotation shaft 102 is provided with a limit structure; and the elastic pads 1082 and the spacers 1086 are provided between the tightening member 1080 and the limit structure, and the frictional force to rotation of the second connection member 106 can be increased by increasing the number of elastic pads 1082 and spacers 1086, wherein the position at which the tightening member 1080 is screwed into the rotation shaft 102 can be adjusted, thereby adjusting the axial pressure to which the second connection member 106 is subjected.

Furthermore, the first connection member 104 is provided with three fixation holes 1040, and the three fixation holes 1040 are arranged non-collinear; and the second connection member 106 is arranged in a bent position, and a reinforcement rib 1066 and a compression deformation reinforcement design are used in the bent position.

Embodiment 11

As shown in FIG. 10, according to a specific embodiment of the present disclosure, the hinge assembly 100 comprises a rotation shaft 102 and two second connection members 106 arranged on the rotation shaft 102, and one of the two second connection members 106 is located at one side of another second connection member 106 in the axial direction of the rotation shaft 102, wherein at least one second connection member 106 is suitable for rotating around the rotation shaft 102, and the hinge assembly 100 further comprises a tightening member 1080, an elastic pad 1082 and a spacer 1086, wherein the tightening member 1080 is arranged at one end of the rotation shaft 102, and another end of the rotation shaft 102 is provided with a limit structure; and the elastic pads 1082 and the spacers 1086 are provided between the tightening member 1080 and the limit structure, and the frictional force to rotation of the second connection member 106 can be increased by increasing the number of elastic pads 1082 and spacers 1086, wherein the position at which the tightening member 1080 is screwed into the rotation shaft 102 can be adjusted, thereby adjusting the axial pressure to which the second connection member 106 is subjected.

Furthermore, the second connection member 106 is provided with a connection hole for mounting the second connection member 106 to another structure. The second connection member 106 is arranged in a bent position, and a reinforcement rib 1066 and a compression deformation reinforcement design are used in the bent position.

Specifically, one of the two second connection members 106 serves as a fixing structure for fixing the rotation shaft 102, that is, one of the two second connection members 106 is fixedly connected to the rotation shaft 102, and another of the two second connection members 106 is rotatably connected to the rotation shaft 102.

Embodiment 12

As shown in FIG. 11, according to a specific embodiment of the present disclosure, the hinge assembly 100 comprises a rotation shaft 102, and a first connection member 104 and two second connection members 106 arranged on the rotation shaft 102, wherein the second connection member 106 is located at one side of the first connection member 104 along the axial direction of the rotation shaft 102, one of the two second connection members 106 is suitable for rotating around the rotation shaft 102, and another second connection member 106 and the first connection member 104 serve as a fixing member for fixing; the hinge assembly 100 further comprises a tightening member 1080, an elastic pad 1082 and a spacer 1086, wherein the tightening member 1080 is provided at one end of the rotation shaft 102, and another end of the rotation shaft 102 is provided with a limit structure; and the elastic pad 1082 and the spacer 1086 are provided between the tightening member 1080 and the limit structure, and the friction force to rotation of the second connection member 106 can be increased by increasing the number of elastic pads 1082 and spacers 1086, wherein the position at which the tightening member 1080 screws into the rotation shaft 102 can be adjusted, thereby adjusting the axial pressure to which the second connection member 106 is subjected.

Furthermore, the first connection member 104 is provided with three fixation holes 1040, and the three fixation holes 1040 are arranged non-collinear; and the second connection member 106 is arranged in a bent position, and a reinforcement rib 1066 and a compression deformation reinforcement design are used in the bent position.

Embodiment 13

According to a second aspect of the present disclosure, there is also provided a household appliance comprising a hinge assembly 100 as set forth in any of the embodiments above.

The household appliance provided in the second aspect of the present disclosure has all the advantageous effects of the hinge assembly 100 by comprising the hinge assembly 100 provided in any of the embodiments described above.

Furthermore, the home appliance comprises a fan or an air conditioner.

In this embodiment, the household appliance comprises a fan or an air conditioner.

Furthermore, the fan comprises: a column assembly; a fan head, one of the second connection member 106 and the first connection member 104 being connected to the fan head, and another of the second connection member 106 and the first connection member 104 being connected to the column assembly.

In this embodiment, the hinge assembly 100 may be used for a fan to realize the adjustment of the pitch angle of the fan, and also the adjustment of the yaw angle of the fan. Specifically, one of the second connection member 106 and the first connection member 104 is connected to the fan head, and another of the second connection member 106 and the first connection member 104 is connected to the column assembly, thereby enabling the adjustment of the pitch or yaw angle of the fan head.

Embodiment 14

According to a third aspect of the present disclosure, there is also provided a rotary device comprising the hinge assembly 100 as set forth in any of the embodiments of the first aspect described above.

The rotary device provided in the third aspect of the present disclosure has all the advantages of the hinge assembly 100 by comprising the hinge assembly 100 as set forth in any of the embodiments of the first aspect described above.

In particular, the rotary device comprises at least a first mounting structure and a second mounting structure, one of the second connection member 106 and the first connection 104 being connected to the first mounting structure, and another of the second connection member 106 and the first connection 104 being connected to the second mounting structure to realize the rotation between the first mounting structure and the second mounting structure.

Specifically, the first mounting structure and the second mounting structure are any two relatively rotatable structures of the household appliance, and may include a cabinet door and a cabinet body of furniture, or the first mounting structure and the second mounting structure include a window frame and a window sash.

Embodiment 15

According to an embodiment of the present disclosure, the present disclosure proposes a fan 200 comprising a column assembly 202, a fan head 204, and a hinge assembly 100.

Specifically, as shown in FIG. 12, the hinge assembly 100 comprises a rotation shaft 102, and a first connection member 104 and a second connection member 106 arranged on the rotation shaft 102, wherein the first connection member 104 is connected to the column assembly 202, the second connection member 106 is connected to the fan head 204, and the second connection member 106 is suitable for rotating around the rotation shaft 102; wherein the rotation shaft 102 is located at the middle portion of one end of the column assembly 202 near to the fan head 204.

The fan 200 provided in the present disclosure comprises a column assembly 202 and a fan head 204, wherein the column assembly 202 and the fan head 204 are connected via a hinge assembly 100; the hinge assembly 100 comprises a rotation shaft 102, and a first connection member 104 and a second connection member 106 arranged on the rotation shaft 102; the first connection member 104 is connected to the column assembly 202, the second connection member 106 is connected to the fan head 204, and the first connection member 104 and the second connection member 106 can rotate around the rotation shaft 102, thereby achieving the rotation of the fan head 204; furthermore and further realizing the adjustment of the air outlet angle of the fan head 204; and meanwhile, the rotation shaft 102 of the hinge assembly 100 is located at the end of the column assembly 202, that is to say, the hinge assembly 100 is connected to the back of the fan head 204 and the column assembly 202. On the one hand the stability of the fan head 204 is improved, and on another hand the fan 200 is made more aesthetically pleasing. Furthermore, the rotation shaft 102 is located at the middle portion of one end of the column assembly 202 near to the fan head 204 to enable greater angular rotation of the fan head 204 during rotation and thus greater adjustment of the pitch angle.

Specifically, the rotation shaft 102 is located at the middle portion of one end of the column assembly 202 near to the fan head 204, i.e., the axis of the rotation shaft 102 is in the same plane as the center of the end of the column assembly 202.

For example, when the end of column assembly 202 is circular, the projection of the axis of shaft 102 on the end face of column assembly 202 is on a diameter of the end face of column assembly 202, and both ends of the rotation shaft 102 have the same distance from the edge of the end face of column assembly 202.

Specifically, the second connection member 106 is connected to the fan head 204, and the second connection member 106 rotates around the rotation shaft 102, so that the fan head 204 can rotate around the rotation shaft 102; furthermore, the rotation shaft 102 is located at the middle portion of one end of the column assembly 202 near to the fan head 204, that is, the rotation shaft 102 is located at the middle portion of the end of the column assembly 202, so that the fan head 204 rotates around the middle portion of the end of the column assembly 202. Then the center of gravity of the fan head 204 will also rotate around the middle portion of the end of the column assembly 202, which allows fan head 204 to be rotated without tilting due to the center of gravity being offset from the center of column assembly 202, thereby improving the stability of fan head 204.

Furthermore, the fan 200 of the present disclosure has better stability than providing the rotation shaft 102 at the edge of the end of the column assembly 202.

Embodiment 16

As shown in FIG. 12, according to an embodiment of the present disclosure, it comprises the features defined by the embodiments described above, and furthermore, the axis of around which the first connection member 104 and the second connection member 106 rotate relative to each other is perpendicular to the length direction of the column assembly 202.

In this embodiment, the axis about which the first connection member 104 and the second connection member 106 rotate relative to each other is perpendicular to the length direction of the column assembly 202, i.e., the pitch angle of the fan head 204 is adjusted, thereby enlarging the air outlet area of the fan 200.

Specifically, the fan 200 may be a floor fan such that the column assembly 202 is disposed in a vertical direction, i.e., the length of the column assembly 202 is in the vertical direction.

Of course, the axis about which the first connection member 104 and the second connection member 106 rotate relative to each other may also be parallel to the column assembly 202 so that a yaw rotation motion of the fan head 204 may be achieved.

Embodiment 17

According to an embodiment of the present disclosure, it comprises the features defined by the embodiments described above, and furthermore, the fan head 204 comprises a drive shaft 116 and fan blades provided at the drive shaft 116; and the axis center of the rotation shaft 102 coincides with the axis of the drive shaft 116.

In this embodiment, the fan head 204 comprises a drive shaft 116 and fan blades, wherein the drive shaft 116 drives the fan blades to rotate so as to exhaust air to the outside, and the fan blades surround the peripheral side of the drive shaft 116, so that the drive shaft 116 is located at the middle portion of the fan 200; the axis of the rotation shaft 102 coincides with the axis of the drive shaft 116, that is, the axis of the drive shaft 116 passes through the axis of the rotation shaft 102, so that during the rotation of the fan head 204, the end of the column assembly 202 always corresponds to the center of the fan head 204. Therefore, the fan head 204 is not eccentric during the rotation, thereby improving the stability of the fan head 204. Meanwhile, since the fan head 204 will not be eccentric during the rotation, the fan head 204 can be rotated by a larger angle.

Specifically, since the rotation shaft 102 is arranged in the middle portion of the end of the column assembly 202, the fan head 204 can always rotate around the middle portion of the end of the column assembly 202 during the rotation; and the fan 200 comprises the drive shaft 116, so that the drive shaft 116 also rotates around the middle portion of the end of the column assembly 202. On this basis, during the rotation of the fan head 204, the axis of the drive shaft 116 always passes through the axis center of the rotation shaft 102, so that during the rotation of the fan 200, the fan head 204 rotates with the axis center of the rotation shaft 102 as a center and the distance between the axis center of the rotation shaft 102 and the drive shaft 116 as a radius, which is equivalent to fixedly connecting the center of the fan head 204 and the center of the end of the column assembly 202.

Therefore, the distance between the center of the fan head 204 and the center of the end of the column assembly 202 is not changed, thereby avoiding the case where the fan head 204 is eccentric during the rotation. On the one hand, the fan head 204 not being eccentric during the rotation improves the aesthetics of the rotation of the fan 200; on another hand, it also enables the fan 200 to rotate by a larger angle.

Specifically, the fan 200 comprises a motor having a drive shaft 116 connected to the fan blades.

Embodiment 18

According to an embodiment of the present disclosure, it comprises the features defined by the embodiments described above, and furthermore, a limit member (not shown in the figure) is provided at the fan head 204 and/or the column assembly 202; wherein the limit member is adapted to limit rotation of the fan head 204 between the first position 112 and the second position 114.

In this embodiment, the extent of rotation of the fan head 204 can be limited by providing the limit member that causes the fan head 204 to rotate between the first position 112 and the second position 114.

Specifically, the limit member may be provided at the fan head 204 or the column assembly 202, and of course, the limit member may be provided at both the fan head 204 and the column assembly 202.

Specifically, limiting the angle of rotation of the fan head 204 may be accomplished by abutment of the limit member against the fan head 204 or the column assembly 202 during rotation of the fan head 204.

Furthermore, the angle at which the fan head 204 rotates towards the lower part of the fan 200 from the horizontal position 110 to the first position 112 is greater than or equal to 0°, and smaller than or equal to 6°; the angle at which the fan head 204 rotates towards the upper part of the fan 200 from the horizontal position 110 to the second position 114 is greater than or equal to 0°, and smaller than or equal to 90°; wherein the horizontal position 110 is located between the first position 112 and the second position 114; and the axis of the drive shaft 116 is perpendicular to the length direction of the column assembly 202 when the fan head 204 is in the horizontal position 110.

In this embodiment, as shown in FIGS. 13 and 14, the horizontal position 110 is located between the first position 112 and the second position 114, and the fan head 204 can move from the horizontal position 110 to the first position 112 and the second position 114 respectively; when the fan head 204 is located at the horizontal position 110, the axis of the drive shaft 116 is perpendicular to the length direction of the column assembly 202, that is, when the fan head 204 is located at the horizontal position 110, the air outlet direction of the fan 200 is a horizontal direction or an approximately horizontal direction, wherein the adjustment of the pitch angle of the fan head 204 can be achieved by means of the hinge assembly 100. FIG. 13 shows a schematic view when the fan head 204 moves to the first position 112, wherein the rotation angle of the fan head 204 towards the lower part of the fan 200 from the horizontal position 110 to the first position 112 is greater than or equal to 0° and smaller than or equal to 6°, that is, the depression angle of the fan head 204 moving downwards from the horizontal position 110 is greater than or equal to 0° and smaller than or equal to 6°. FIG. 14 shows a schematic view of the movement of the fan head 204 to the second position 114, wherein the angle at which the fan head 204 rotates towards the upper side of the fan 200 from the horizontal position 110 to the second position 114 is greater than or equal to 0°, and smaller than or equal to 90°, i.e., the elevation angle at which the fan head 204 moves upward from the horizontal position 110 is greater than or equal to 0° and smaller than or equal to 90°. That is, the fan head 204 can achieve a depression angle of 6° and an elevation angle of 90°, which expands the blowing range of the fan 200.

Specifically, the first position 112 is below the horizontal position 110 and the second position 114 is above the horizontal position 110.

Embodiment 19

As shown in FIG. 12, according to an embodiment of the present disclosure, it comprises the features defined by the embodiments described above, and furthermore, the hinge assembly 100 also comprises: a tightening member 1080, wherein the tightening member 1080 is provided at the rotation shaft 102 and is located at one end of the rotation shaft 102, both the rotation shaft 102 and the tightening member 1080 are provided with a threaded structure, and the tightening member 1080 is in threaded connection with the rotation shaft 102 via the threaded structure; wherein another end of the rotation shaft 102 is further provided with a limit structure, and the first connection member 104 and the second connection member 106 are located between the limit structure and the tightening member 1080.

In this embodiment, one end of the rotation shaft 102 is provided with the tightening member 1080, and another end is provided with a limit structure; the first connection member 104 and the second connection member 106 are provided between the limit structure and the tightening member 1080, and the pressing force applied on the second connection member 106 can be adjusted via the tightening member 1080, wherein both the tightening member 1080 and the rotation shaft 102 are provided with a threaded structure, and the tightening member 1080 is threadedly connected with the rotation shaft 102 via the threaded structure, so that the pressing force applied on the second connection member 106 by the tightening member 1080 can be adjusted, and the threaded connection is highly reliable; and when the tightening member 1080 is rotated to be removed from the rotation shaft 102, it facilitates the disassembly and replacement of parts on the rotation shaft 102.

Specifically, the rotation shaft 102 and the limit structure provided at the end of the rotation shaft 102 are of a one-piece structure, the rotation shaft 102 comprises a bolt or a screw, and the tightening member 1080 comprises a nut.

Specifically, the tightening member 1080 extrudes the second connection member 106 along the axial direction of the rotation shaft 102, and the magnitude of the axial pressure against the second connection member 106 can be adjusted. The greater the axial pressure received by the second connection member 106, the greater the resistance received by the second connection member 106 when it rotates, and thus the greater the force required enabling the second connection member 106 to rotate around the rotation shaft 102. Therefore, the magnitude of the force required for the second connection member 106 to rotate can be adjusted by the tightening member 1080. At the same time, by adjusting the axial pressure received by the second connection member 106, the frictional force between the second connection member 106 and the adjacent components can be adjusted, that is to say, the greater the axial pressure received by the second connection member 106, the greater the frictional force between the second connection member 106 and the adjacent structure. When the frictional force is brought against the force applied to the second connection member 106 to rotate around the second connection member 106, the second connection member 106 is fixed at a designated position, and thus the member connected to the second connection member 106 is fixed at a designated position without random rotation, thereby improving the reliability of the hinge assembly 100. It will be appreciated that the resistance to rotation of the second connection member 106 comprises frictional forces generated between the second connection member 106 and components axially adjacent to the second connection member 106.

Specifically, the first connection member 104 is rotatable about the rotation shaft 102, or the first connection member 104 is fixed to the rotation shaft 102.

Specifically, the first connection member 104 is fixed to the rotation shaft 102, and the rotation shaft 102 can be fixed by the first connection member 104.

Furthermore, as shown in FIG. 12, the hinge assembly 100 further comprises a damping member provided at the rotation shaft 102, the damping member provided between the first connection member 104 and the tightening member 1080.

In this embodiment, the damping member is connected to the rotation shaft 102, and the damping member can increase the resistance to rotation of the second connection member 106, so that the frictional force generated when the second connection member 106 rotates increases, and the force required for the rotation of the second connection member 106 also increases, thereby improving the stability of the hinge assembly 100. The damping member may be selectively provided between the first connection member 104 and the tightening member 1080, and between the second connection member 106 and the first connection member 104.

Specifically, the amount of force required to rotate the second connection member 106 can be adjusted by adding or subtracting the damping members. For example, the resistance to rotation of the second connection member 106 can be increased by adding a damping member when the tightening member 1080 is screwed on the same position of the rotation shaft 102, thereby increasing the force required to rotate the second connection member 106, i.e., if the second connection member is required to rotate, a greater force is required to be applied; and when the resistance to rotation of the second connection member 106 is greater than or equal to the force applied to the second connection member 106 by other structures or people, the current state of the hinge assembly 100 can be maintained, i.e., the second connection member 106 can be kept stationary, thereby improving the stability of the hinge assembly 100.

Specifically, other structures other than the hinge assembly 100, comprising a fan head 204 of a fan 200 or a column assembly 202 of a fan 200, may be connected to the second connection member 106, and a force may be applied to the second connection member 106 in a rotation direction of the second connection member 106, so that the hinge assembly 100 and another structures mounted at the second connection member 106 are maintained in a current state when the resistance to the rotation of the second connection member 106 is greater than or equal to the force applied to the second connection member 106 by another structures, thereby improving the stability of the second connection member 106 and another structures connected to the second connection member 106.

Furthermore, the hinge assembly 100 comprises a spacer 1086 disposed on the rotation shaft 102; the spacer 1086 is disposed between the second connection member 106 and the limit member structure; and/or the spacer 1086 is disposed between the first connection member 104 and the second connection member 106; and/or the spacer 1086 is disposed between the first connection member 104 and the threaded member 1080.

In this embodiment, the spacer 1086 may be provided between the two structures to improve the stability of the connection. Herein, a spacer 1086 is provided between the second connection member 106 and the limit structure, and/or a spacer 1086 is provided between the second connection member 106 and the first connection member 104, and/or a spacer 1086 is provided between the first connection member 104 and the tightening member 1080.

Specifically, both ends of the spacer 1086 abut against other structures in the axial direction of the rotation shaft 102, i.e., the spacer 1086 may extrude the structures on both sides, thereby increasing the force required to rotate the structures on both sides of the spacer 1086 and improving the stability of the hinge assembly 100.

Furthermore, the damping member comprises any one or a combination of an elastic pad 1082, a viscous damping member, and an idler.

In this embodiment, the damping member comprises any one or a combination of an elastic pad 1082, a viscous damping member, and an idler to improve the stability of the hinge assembly 100. Furthermore, the viscous damping member comprises damping oil.

Furthermore, a limit surface is formed on at least part of the rotation shaft 102 along the axial direction of the rotation shaft 102; and the spacer 1086 is provided with a through hole, and the shape of the cross section of the through hole is adapted to the shape of the cross section of a portion of the rotation shaft 102 provided with the limit member surface.

In this embodiment, the limit surface is formed on the rotation shaft 102 along the axial direction of the rotation shaft 102, and the cross section of the through hole of the spacer 1086 is adapted to the shape of the portion of the rotation shaft 102 provided with the limit surface, so that the spacer 1086 cannot rotate along the rotation shaft 102, thereby improving the stability of the hinge assembly 100.

Specifically, the portions of the rotation shaft 102 connected to other structures of the hinge assembly 100 except the second connection member 106 and the tightening member 1080 may be correspondingly provided with a limit surface, and the shapes of the mounting hole portions of another structures, except the second connection member 106 and the tightening member 1080, connected to the rotation shaft 102 are adapted to the rotation shaft 102, thereby preventing another structures from rotating and improving the reliability of the structure.

Furthermore, the number of the limit surfaces is at least two, and the at least two limit surfaces are oppositely arranged along the circumferential direction of the axis of the rotation shaft 102.

In this embodiment, at least two limit surfaces are oppositely arranged along the circumferential direction of the axis of the rotation shaft 102, which improves the limiting effect of the limit surfaces.

Embodiment 20

As shown in FIG. 12, according to an embodiment of the present disclosure, it comprises the features defined by the embodiments described above, and furthermore, the number of the second connection members 106 is at least two, the first connection member 104 is provided with a mounting groove, and two of the at least two second connection members 106 are provided in the mounting groove.

In this embodiment, the second connection members 106 are at least two, thereby improving the connection strength between the hinge assembly 100 and the fan head 204, and meanwhile, the two second connection members 106 are arranged in the mounting grooves of the first connection member 104, improving the connection strength of the hinge assembly 100, and preventing the second connection members 106 from falling off.

Specifically, there are two second connection members 106, wherein the two second connection members 106 are both located in a mounting groove of the first connection member 104, and the two second connection members 106 are limited therebetween by a damping member, a spacer 1086 and a friction plate.

Embodiment 21

According to an embodiment of the present disclosure, it comprises the features defined by the embodiments described above, and furthermore, a second connection member 106 is provided at one side of the first connection member 104 along the axial direction of the rotation shaft 102.

In this embodiment, the second connection member 106 is located at one side of the first connection member 104 along the axial direction of the rotation shaft 102, that is, the second connection member 106 is located at the outer side of the first connection member 104, so that the first connection member 104 and the second connection member 106 can be sequentially mounted at the rotation shaft 102, improving the assembly efficiency of the product and enhancing the reliability of the product. At the same time, the first connection member 104 can avoid the second connection member 106 when the second connection member 106 rotates, thereby enabling the second connection member 106 to have a greater rotation angle so as to satisfy different use scenarios.

Embodiment 22

According to an embodiment of the present disclosure, it comprises the features defined by the embodiments described above, and furthermore, the fan head 204 also comprises a motor housing, wherein a drive shaft 116 and fan blades are provided in the motor housing; wherein a wire passing member 2040 is provided at the motor housing, and the fan 200 further comprises a wire passing member 2040 adapted for the connection wire to pass through.

In this embodiment, the fan head 204 further comprises a motor housing, a motor is provided in the motor housing, and the motor comprises a drive shaft 116, and a fan blade is connected to the drive shaft 116, wherein a wire passing member 2040 is provided at the motor housing, the fan 200 further comprises a connection wire, and the connection wire passes through a gap between the two second connection members 106 via the wire passing member 2040 and is then connected to the motor, so that the wiring is more reasonable.

Specifically, the second connection member 106 is mounted at the motor housing.

Embodiment 23

As shown in FIG. 12, according to an embodiment of the present disclosure, it comprises the features defined by the embodiments described above, and furthermore, the column assembly 202 comprises a column; a bracket provided at an end of the column near to the fan head 204, wherein the first connection member 104 is connected to the bracket.

In this embodiment, the column assembly 202 comprises a column and a bracket, wherein the bracket is provided at an end of the column, and then the first connection member 104 is mounted at the end of the column via the bracket, so as to realize the fixing of the hinge assembly 100.

Embodiment 24

According to a specific embodiment of the present disclosure, as shown in FIG. 12, the present disclosure proposes a fan 200, comprising: a fan head 204 and a column assembly 202, and a hinge assembly 100 connecting the fan head 204 and the column assembly 202, wherein the hinge assembly 100 comprises a rotation shaft 102, and a first connection member 104 and two second connection members 106 arranged on the rotation shaft 102. The two second connection members 106 are arranged in a mounting groove of the first connection member 104, and the two second connection members 106 are limited by means of a spacer 1086, a friction plate and an elastic pad 1082, wherein the rotation shaft 102 is located at the end of the column assembly 202, and the fan head 204 comprises the rotation shaft 102; the axis of the rotation shaft 102 passes through the axis center of the rotation shaft 102 such that the center of the fan head 204 is at a constant distance from the center of the end of the column assembly 202, thereby avoiding eccentricity of the fan head 204 during rotation, which, on the one hand, improves the aesthetics of rotation of the fan 200 and, on another hand, allows the fan 200 to rotate by a greater angle.

Specifically, as shown in FIGS. 13 and 14, the fan head 204 can achieve a maximum depression angle of 6° and a maximum elevation angle of 90°, and can be arbitrarily adjusted between the maximum depression angle and the maximum elevation angle.

Furthermore, the brackets of the column assembly 202 secure the ends of the hinge assembly 100.

Furthermore, a limit surface is provided at two opposite sides of the rotation shaft 102, and the through hole of the tightening member 1086 is adapted to the shape of the portion provided with the limiting face, so that the loosening of the tightening member 1080 can be prevented. Specifically, the through-hole of the spacer 1086 is U-shaped.

Specifically, a wire passing member 2040 is provided. Specifically, the wire passing member 2040 is of a hollowed-out shape, so that the wire passing through the wire passing member 2040 is convenient and reliable.

Specifically, the second connection member 106 is mounted to a motor mount of the fan head 204.

In the present disclosure, the term "plurality" refers to two or more, unless explicitly defined otherwise. The terms "mounted," "connected with," "connected to," "fixed," and the like should be construed broadly. For example, "connected" may be a fixed connection, may be a detachable connection, or may be integrally connected; and "connected with" can be either directly or indirectly through an intermediary. The specific meaning of the above terms in the present disclosure will be understood in specific circumstances by those of ordinary skill in the art.

In the specification of the present application, the description by the terms of "an embodiment," "some embodiments," "specific embodiment" and the like means that the specific features, structures, materials or characteristics described in combination with the embodiments or examples are contained in at least one embodiment or example of the present application. In the specification, the illustrative expressions of the above terms may not indicate the same embodiments or examples. In addition, the specific features, structures, materials or characteristics as described may be combined in an appropriate method in one or more of any embodiments or examples.

The above are merely preferred embodiments of the present disclosure and not intended to limit the disclosure. The disclosure may have various modifications and changes for those skilled in the art. Any modifications, equivalents, improvements, etc. within the spirit and principles of the present disclosure are intended to be included within the scope of the present disclosure.

What is claimed is:

1. A hinge assembly comprising:
   a rotation shaft;
   a first connection member provided at the rotation shaft, the first connection member including two ends protruding out from a central body of the first connection member along directions parallel to the axial direction of the rotation shaft, the rotation shaft passing through the central body of the first connection member, and the first connection member being symmetrical about the rotation shaft;
   a second connection member provided at the rotation shaft, and located at one side of the first connection member along an axial direction of the rotation shaft, the second connection member being configured to rotate around the rotation shaft, and the second connection member being identical to the first connection member; and
   an adjustment member connected to the rotation shaft, and configured to press the second connection member along the axial direction of the rotation shaft.

2. The hinge assembly according to claim 1, wherein:
   the adjustment member includes a tightening member located at one end of the rotation shaft, the rotation shaft and the tightening member being provided with threaded structures, and the tightening member being in threaded connection with the rotation shaft via the threaded structures; and
   another end of the rotation shaft is provided with a limit structure, and the first connection member and the second connection member being arranged between the limit structure and the tightening member.

3. The hinge assembly according to claim 2, wherein the adjustment member further includes at least one of:
   a damping member connected to the rotation shaft, and provided between the first connection member and the tightening member, or between the second connection member and the first connection member; or
   a spacer connected to the rotation shaft, and provided between the second connection member and the limit structure, between the second connection member and the first connection member, or between the first connection member and the tightening member.

4. The hinge assembly according to claim 3, wherein the damping member includes at least one of an elastic pad, a viscous damping member, or an idler.

5. The hinge assembly according to claim 1, wherein an angle of rotation of the second connection member around the rotation shaft is greater than or equal to 0°, and smaller than or equal to 360°.

6. The hinge assembly according to claim 1, wherein the first connection member is provided with at least three fixation holes distributed around a circumference of the rotation shaft.

7. The hinge assembly according to claim 1, wherein
   the first connection member is one of at least two first connection members; and
   at least one of the at least two first connection members is identical to the second connection member.

8. The hinge assembly according to claim 7, wherein the second connection member is located between two of the at least two first connection members along the axial direction.

9. The hinge assembly according to claim 1, wherein the second connection member includes:
   a connection part connected to the rotation shaft; and
   a mounting part connected to the connection part.

10. The hinge assembly according to claim 9, wherein:
    an included angle is provided between the connection part and the mounting part;
    a reinforcement rib is provided at a connection between the connection part and the mounting part;
    the connection part and the mounting part are of a one-piece structure; and/or
    a clearance hole is provided at the connection part, and the clearance hole is configured to communicate with the fixation hole of the first connection member along the axial direction of the rotation shaft.

11. A household appliance comprising:
    the hinge assembly according to claim 1.

12. The household appliance according to claim 11, wherein the household appliance includes a fan and the fan includes:
    a column assembly; and
    a fan head, one of the second connection member and the first connection member being connected to the fan head, and another of the second connection member and the first connection member being connected to the column assembly.

13. A rotary device comprising:
    the hinge assembly according to claim 1.

14. A fan comprising:
    a column assembly;
    a fan head; and
    the hinge assembly according to claim 1.

15. The fan according to claim 14, wherein an axis around which the first connection member and the second connection member rotate relative to each other is perpendicular to a length direction of the column assembly.

16. The fan according to claim 14, wherein:
    the fan head includes a drive shaft and a fan blade provided at the drive shaft; and
    an axis center of the rotation shaft coincides with an axis of the drive shaft.

17. The fan according to claim 16, further comprising:
    a connection wire;
    wherein:
       the fan head further includes a motor housing;
       the drive shaft and the fan blade are provided in the motor housing; and
       a wire passing member is provided at the motor housing and configured for the connection wire to pass through.

18. The fan according to claim 14, wherein:
    the second connection member is provided at one side of the first connection member along an axial direction of the rotation shaft; or the second connection member is one of at least two second connection members, a mounting groove is provided at the first connection member, and two of the at least two second connection members are provided in the mounting groove.

19. The fan according to claim 14, wherein the column assembly includes:
    a column; and
    a bracket provided at one end of the column close to the fan head, the first connection member being connected to the bracket.

20. A hinge assembly comprising:
    a rotation shaft;
    a first connection member provided at the rotation shaft, the first connection member being provided with a fixation hole at a side of the rotation shaft;
    a second connection member provided at the rotation shaft, and located at one side of the first connection member along an axial direction of the rotation shaft, the second connection member being configured to rotate around the rotation shaft, the second connection member including a connection part connected to the rotation shaft, and a mounting part connected to the connecting part, a clearance hole being provided at the connecting part and configured to communicate with the fixation hole of the first connection member along a direction parallel to the rotation shaft, and an opening area of the clearance hole being greater than an opening area of the fixation hole; and
    an adjustment member connected to the rotation shaft, and configured to press the second connection member along the axial direction of the rotation shaft.

* * * * *